United States Patent [19]

Anderson et al.

[11] Patent Number: 4,890,864
[45] Date of Patent: Jan. 2, 1990

[54] INSULATED DUCT END SYSTEM

[75] Inventors: Charles B. Anderson, Jacksonville, Tex.; C. Robert Kenrick, Spring Lake, Mich.

[73] Assignee: C-System Incorporated, Fort Worth, Tex.

[21] Appl. No.: 145,298

[22] Filed: Jan. 19, 1988

Related U.S. Application Data

[62] Division of Ser. No. 902,863, Sep. 2, 1986, Pat. No. 4,735,235.

[51] Int. Cl.⁴ .............................................. F16L 45/00
[52] U.S. Cl. .................................... 285/121; 285/150; 285/158; 285/47
[58] Field of Search ................ 285/150, 47, 205, 208, 285/424, 121, 158; 98/40.01, DIG. 7, DIG. 11; 130/DIG. 4; 137/315

[56] References Cited

U.S. PATENT DOCUMENTS

| | | | |
|---|---|---|---|
| 2,338,191 | 1/1944 | Lumm | 285/424 X |
| 2,545,030 | 3/1951 | Isenberg et al. | 138/149 |
| 2,919,721 | 1/1960 | Isenberg | 138/149 |
| 2,980,144 | 4/1961 | Edwards, Jr. et al. | 138/109 |
| 3,726,545 | 4/1973 | Grim et al. | 285/40 X |
| 4,182,379 | 1/1980 | Lestak et al. | 138/149 |
| 4,208,373 | 6/1980 | Matovich | 138/109 |
| 4,307,756 | 12/1981 | Voigt et al. | 138/149 |
| 4,351,366 | 9/1982 | Angioletti | 138/149 |
| 4,380,253 | 4/1983 | Mead et al. | 138/149 |
| 4,491,124 | 1/1985 | Goettel | 285/424 |
| 4,492,089 | 1/1985 | Rohner et al. | 138/149 |
| 4,570,679 | 2/1986 | Schippl | 138/149 |

OTHER PUBLICATIONS

Atco Brochure "Introducing the Package Deal, The HVA C-System from Atco".

Primary Examiner—Dave W. Arola
Attorney, Agent, or Firm—Price, Heneveld, Cooper, DeWitt & Litton

[57] ABSTRACT

The specification discloses a low-cost, simple, and efficient duct system for conveying heated and/or cooled air throughout a building. The system includes duct assemblies and transition components for interconnecting the duct assemblies. Each duct assembly includes an insulated duct having a rigid sleeve within at least one end. Each sleeve includes an abutment ring and orifices in the ring for permitting air to flow into the insulated layer to balloon the layer and improve its insulative effect. Each transition component includes a rigid external skeleton and a plurality of duct board panels fitted therein. After the sleeves are fitted within openings in the duct board panels, the tabs are deformed to retain the abutment rings in engagement with the panels.

14 Claims, 6 Drawing Sheets

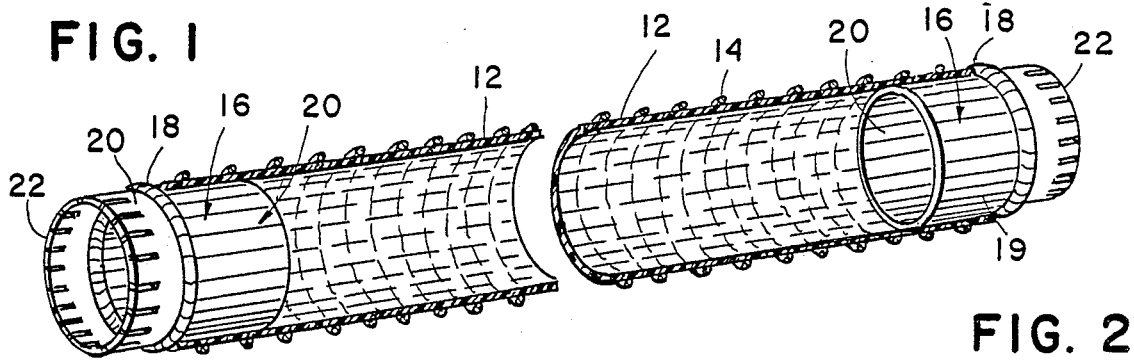
FIG. 1
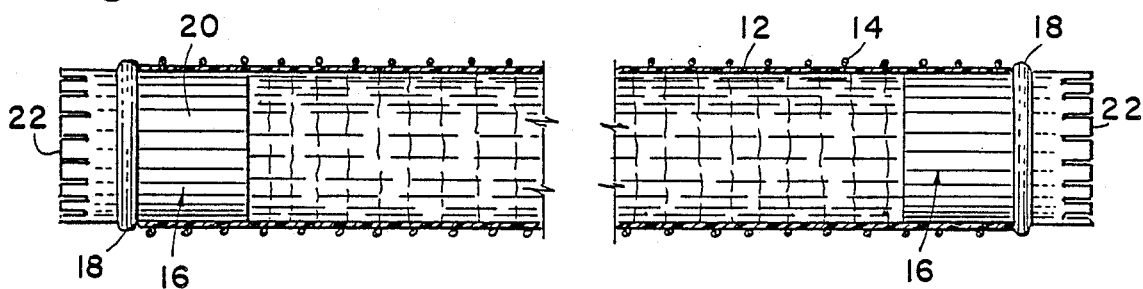
FIG. 2
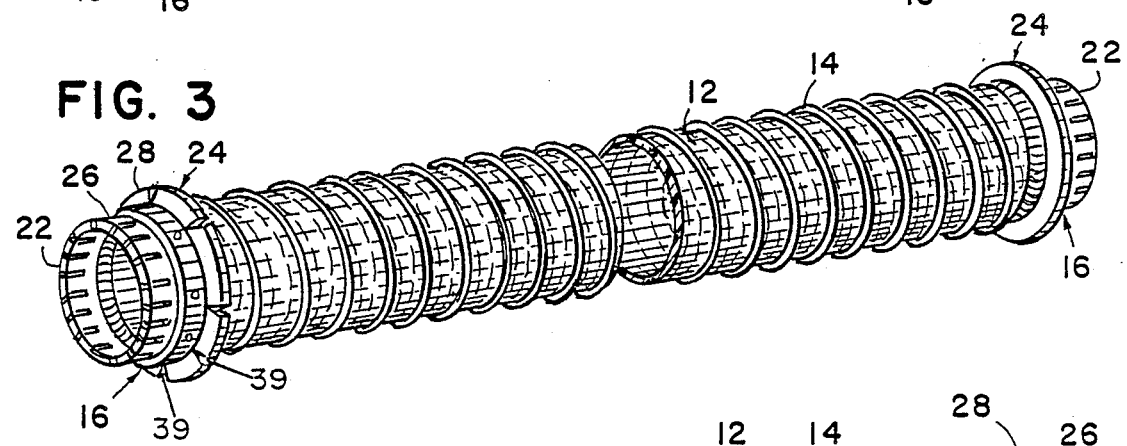
FIG. 3
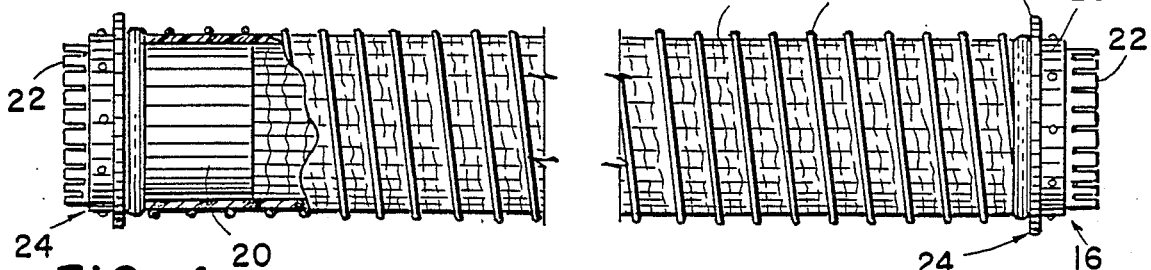
FIG. 4
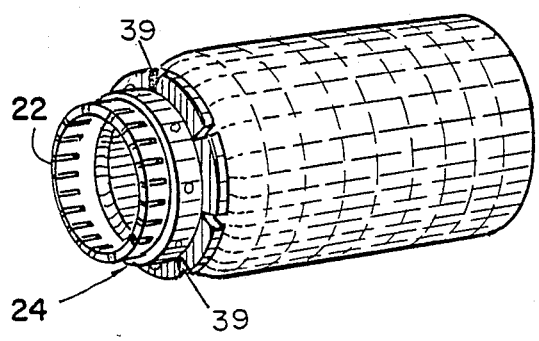
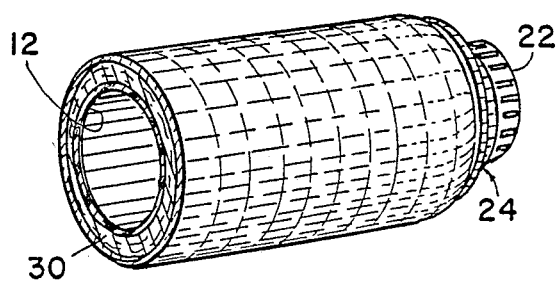
FIG. 5

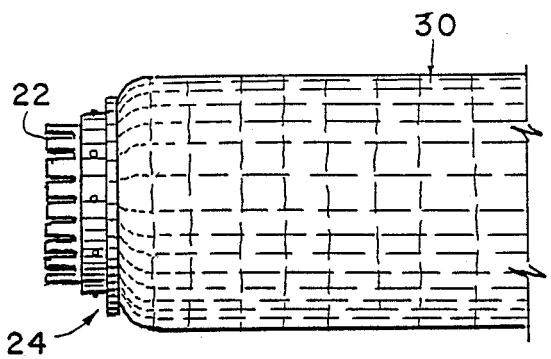
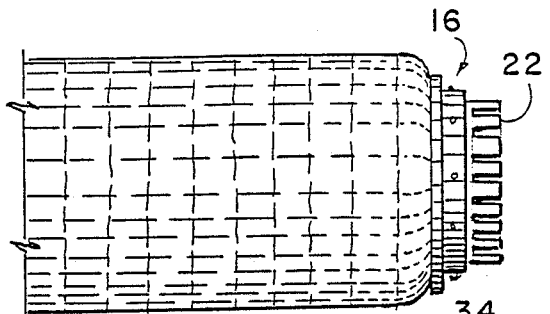
FIG. 6
FIG. 7
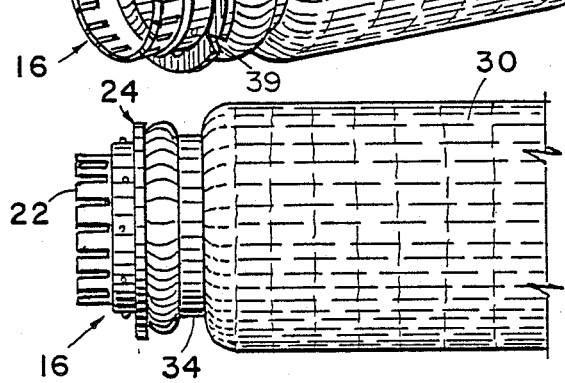
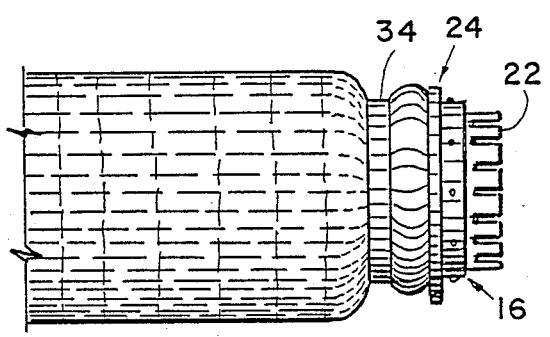
FIG. 8
FIG. 9
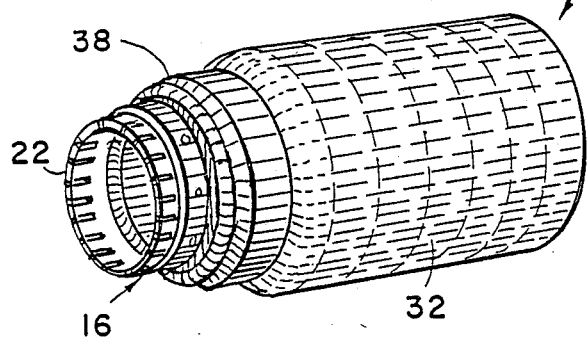
FIG. 10
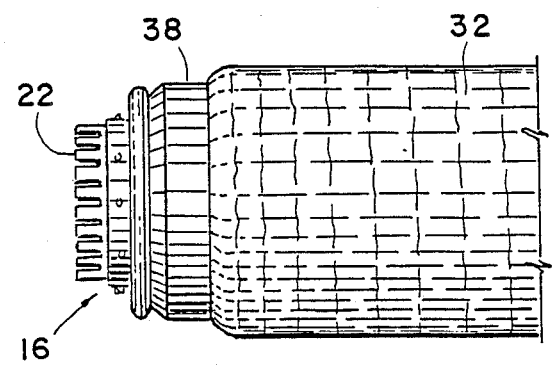
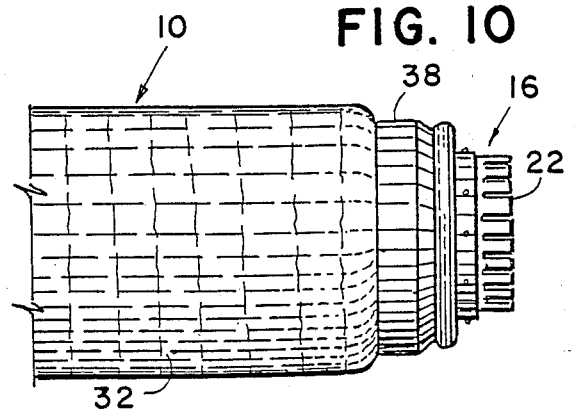

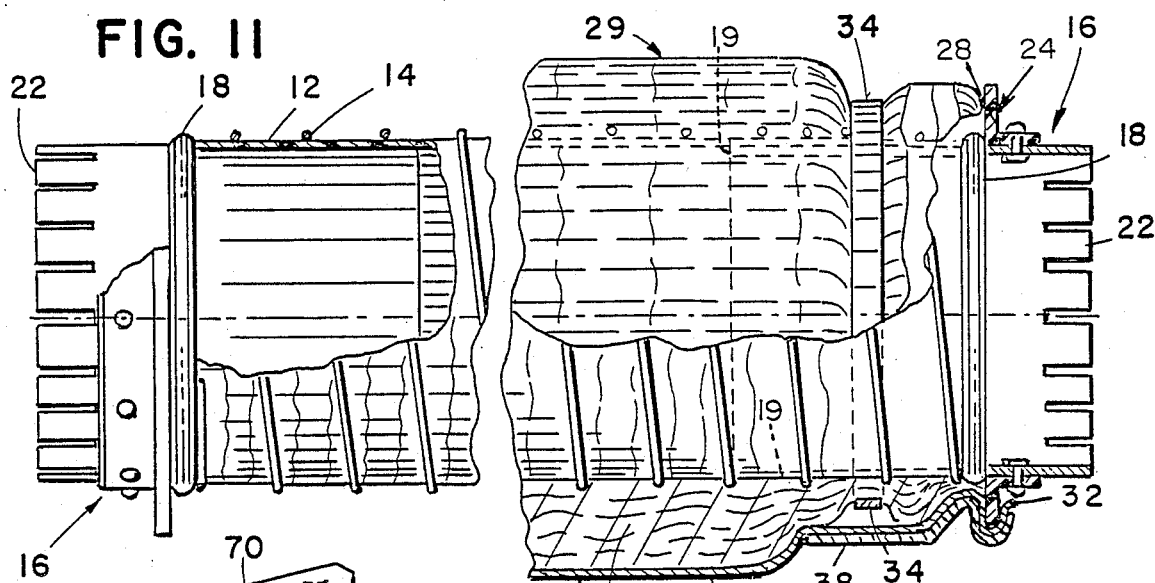
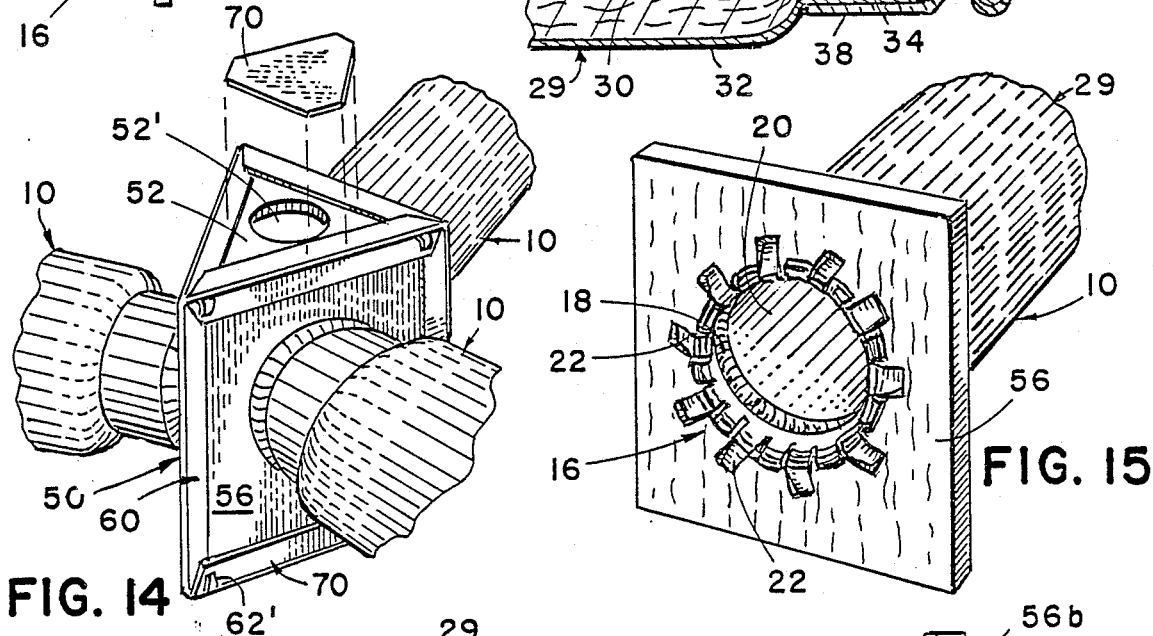
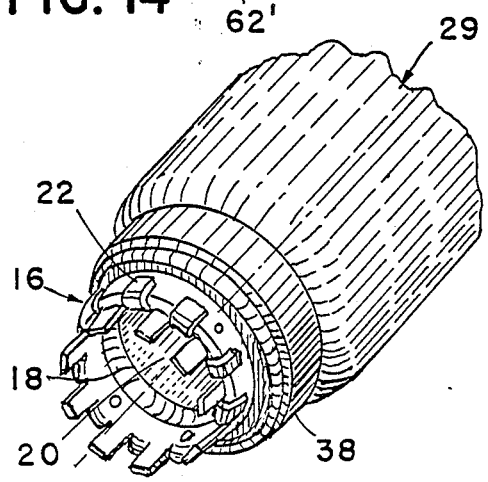
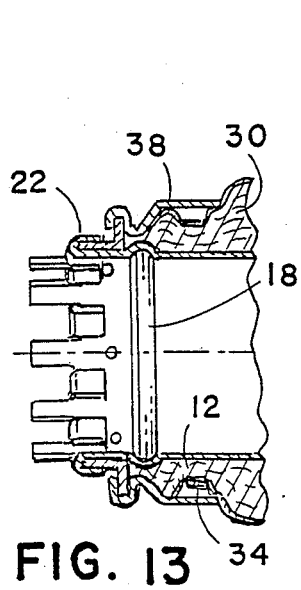
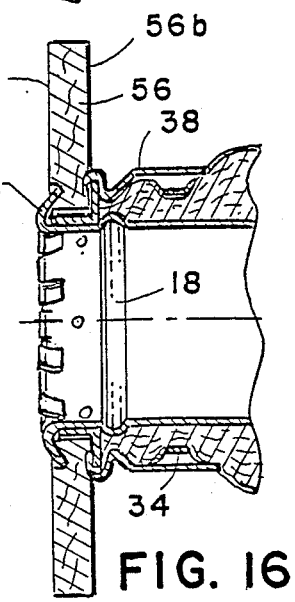

INSULATED DUCT END SYSTEM

This is a division of application Ser. No. 902,863, filed Sept. 2, 1986, now U.S. Pat. No. 4,735,235 issued April 5, 1988.

BACKGROUND OF THE INVENTION

This invention relates to insulated duct systems.

Insulated duct is widely employed in buildings for conveying heated air or cooled air for temperature control of interior environment. Typically such systems are fabricated and installed on the job, in piecemeal fashion, with tremendous waste of material being common. Skilled craftsmen are necessary for interfitting sheet metal sections and flexible duct sections to form the duct network, but little effort is applied toward optimum use of materials, such that a completed system typically is accompanied by piles of wasted scrap sheet metal components, insulation, insulated flexible duct, and related materials. It is considered more economical to allow the highly paid craftsmen to waste material than to spend the time for determining optimum usage thereof. Moreover, it is difficult to try to optimize air flow through the various branches of the duct system. Thus, a small room supplied by the system might receive tremendous air flow while a much larger room might only receive minimal air flow. Flow restricting baffles are then inserted in register faces in an effort to alter such conditions, resulting in substantial air flow inefficiencies, audible whistling effects, and distracting "howling" sounds when air flow through large ducts is started and stopped.

Even with skilled craftsmen, the assembly techniques commonly used usually result in leakage of the conveyed air. To overcome such leakage, which results in inefficiency, poor air flow, noise and condensation, ducting tape is liberally applied around all of the joints, somewhat comparable to covering wounds with a generous supply of bandages. Ducting tape notoriously breaks loose in time, resulting in lost efficiency and higher energy usage.

In the particular problem area of the connection of an insulated duct to a duct board opening, one known technique is to place a clamp around the joint and then wrap the entire area in ducting tape. But, as noted above, taping is a poor temporary solution. Another technique is to place a plastic or duct board ring around the end portion of the duct, inside of the exterior jacket of the insulated duct, and then insert the duct with its insulating jacket into the opening until the ring abuts the duct board. But, air still leaks out between the duct board and the jacket to create problems.

In an attempt to overcome some of the above-noted prior art problems, the assignee of the present invention manufactured and sold a duct system including a plurality of duct assemblies interconnected using transition components. Each duct assembly included a flexible insulated duct having rigid sleeves inserted at either end thereof. The duct was taped to the sleeve using duct tape, which as noted above is an inefficient manner of interconnecting such components. The transition components each included a plurality of duct board panels taped together to form an enclosed polyhedron. These transition components proved to be of insufficient strength in installation and actual use. The taped duct board panels also suffered the disadvantages noted above in conjunction with taping. To interconnect these elements, the duct sleeves were inserted through openings cut in the duct board transition components; and bendable sleeve tabs were bent to retain the sleeves within the transition components.

SUMMARY OF THE INVENTION

This invention provides a novel duct system having several unique features and advantages.

In a first aspect of the invention, the ends of the duct have a unique closure and seal construction which not only closes off the duct against leakage of air to the outside of the duct, but also creates a ballooning effect beneath the jacket of the duct, to achieve a greater R-factor rating for the system. More specifically, each duct assembly includes a flexible duct and a pair of sleeves inserted at either end. The flexible duct includes an insulation layer sandwiched between two air impervious layers. The rigid sleeves within either end of the duct define orifice means permitting air to flow therethrough into the insulation layer for ballooning thereof. Air leaking between the duct assembly and transition component is therefore "recaptured" in a manner enhancing the insulative value of the system.

In a second aspect of the invention, novel transition components are provided for interconnecting the duct assemblies. Each transition component includes a rigid external framework and a plurality of duct board panels or walls fitted therein. The transition components are extremely strong and can withstand the handling normally incurred prior to and during installation. In a preferred aspect, each frame element of the external skeleton is L-shaped to receive the edges of adjacent duct board panels. Further preferably, an access opening is provided in one of the duct board panels and is covered by a removable closure which permits an installer to reach into the transition component to connect a duct assembly thereto.

These and many other features, objects and advantages of the invention will be apparent upon studying the following specification in conjunction with the drawings.

BRIEF DESCRIPTION OF THE DRAWINGS

FIG. 1 is a perspective cutaway view of three components of the assembly of this invention, namely a reinforced polymeric tube and a pair of metallic end sleeves;

FIG. 2 is a side elevational sectional view of the components in FIG. 1;

FIG. 3 is a perspective view of the components in FIGS. 1 and 2 plus a pair of polymeric rings around the sleeves;

FIG. 4 is a side elevational partially sectional view of the components in FIG. 3;

FIG. 5 is a perspective view of the components in FIGS. 3 and 4 plus a layer of thermal insulation around and along the polymeric tube;

FIG. 6 is an elevational view of the components in FIG. 5;

FIG. 7 is a perspective view of the components in FIGS. 5 and 6 plus a pair of peripheral clamps around the insulation layer and sleeves;

FIG. 8 is an elevational view of the components in FIG. 7;

FIG. 9 is a perspective view of the components in FIGS. 7 and 8 plus an annular collar at each end of the assembly;

FIG. 10 is an elevational view of the subassembly in FIG. 9;

FIG. 11 is an enlarged elevational partially sectioned view of the invention, with the upper left end portion being comparable to the subassembly in FIG. 2, the lower left end portion being comparable to the subassembly in FIG. 4, the upper right end portion of FIG. 11 being comparable to the subassembly in FIGS. 7 and 8, and the lower right end portion being comparable to the subassembly in FIG. 10;

FIG. 12 is a perspective view of the right end of the assembly in FIG. 11, showing some of the tabs of the metallic sleeve bent back over the polymeric ring;

FIG. 13 is a side elevational sectional view of the structure in FIG. 12;

FIG. 14 is a perspective view of an assembly of three of the ducts in FIGS. 12 and 13 connected to a novel transition component;

FIG. 15 is a breakaway perspective view showing the interconnection of one of the ducts in FIG. 14 connected to one of the duct board panels forming part of the transition component in FIG. 14;

FIG. 16 is a side elevational sectional view of the assembly in FIG. 15;

DESCRIPTION OF THE PREFERRED EMBODIMENTS

Figure 17:
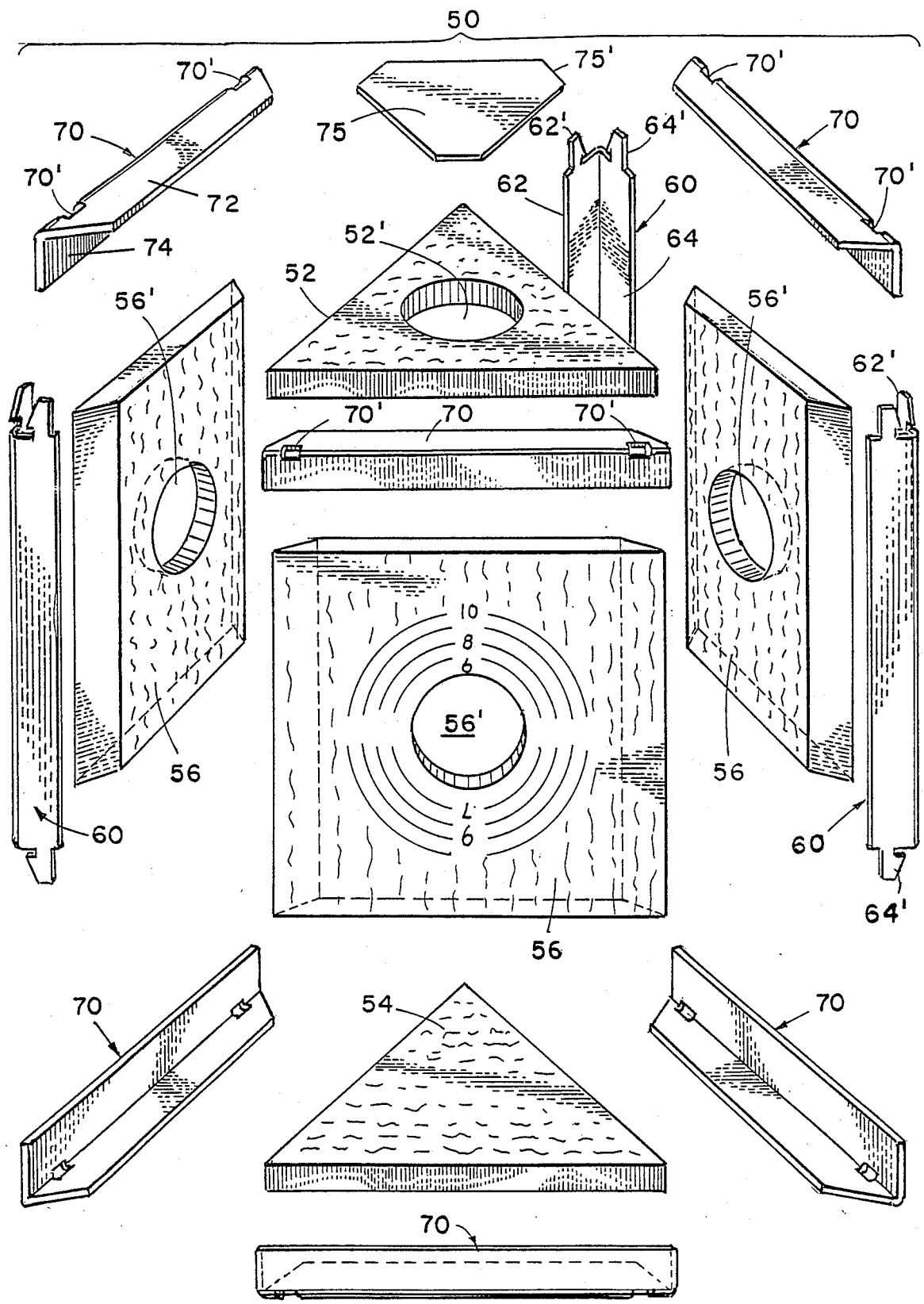
FIG. 17 an exploded perspective view of the transition component in FIG. 14.
Figure 18:
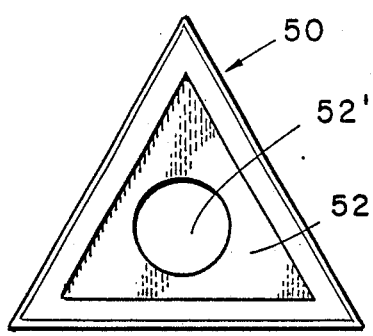
FIG. 18 is a top end view of the transition component in FIGS. 14 and 17.
Figure 19:
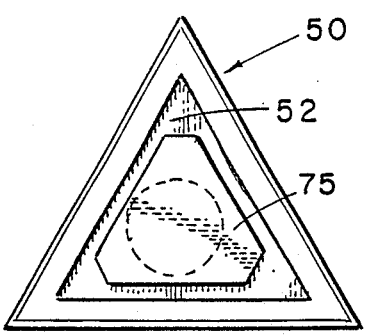
FIG. 19 is the view of FIG. 18 with a cover plate over the opening.
Figure 20:
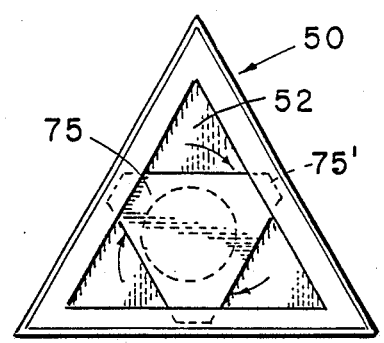
FIG. 20 is another view of FIGS. 18 and 19 with the cover plate rotated into locking position.

Referring now to the drawings, the complete individual duct assembly (FIGS. 9 and 10) 10 is made up of a series of components the assembly of which is shown sequentially in FIGS. 1-8. The central components include a conventional reinforced polymeric tube 12 reinforced by a helical wire or polymeric strand 14 along its length. Slid into the ends of the polymeric tube is a pair of metallic sleeves 16, each of which includes an annular outwardly protruding rib 18 formed into its periphery. The ends of the polymeric tube abut against this rib, i.e., the axially inner wall of the rib, to locate the position of the sleeve relative to the tube. The remaining portion of the sleeves extends beyond the ends of the tube and includes a solid annular portion 20 and an outer end portion severed into peripheral tabs 22.

A pair of rings 24, each L-shaped in cross sectional configuration, are slid over the outer ends of sleeves 16 until they abut against the axially outer wall of ribs 18. Thus, the axially extending leg of the ring 24 is positioned around the solid portion 20 of the sleeves 16, while the other leg protrudes radially outwardly, abutting against the rib 18. By forming these rings of polymeric material, rather than metal, condensation on the ring surface is basically eliminated when the insulated duct is used in a humid atmosphere, while conducting cold air therethrough. The rings 24 may be riveted in place to the sleeves while also being retained by bending some of the tabs 22 over the leg 26 of the ring (FIGS. 12 and 13), or alternatively may simply be retained in place by the bent tabs without rivets or the like. Although these rings may be placed on the subassembly prior to application of the insulation 29, preferably the insulation is placed around the polymeric tube and then the rings 24 slid over both ends of the subassembly, i.e., over the sleeves 16, to abut the ends of the insulation. This insulation comprises a conventional layer of thermal insulation, e.g., a layer of fiberglass 30 (FIG. 11) covered by a jacket 32 of aluminum foil or the equivalent. The ends of the insulation 30 and the tube 12 are clamped onto the inner ends 19 of sleeves 16 by a pair of peripheral outer clamps 34 comparable to hose clamps. This clamp or draw band closes up the voids while accommodating any irregularities in the configuration.

An annular collar 38 extends around the ends of the insulation and jacket and includes a curled bead, U-shaped in cross section, which encompasses the periphery of leg 28 of rings 24. (Lower right portion of FIG. 11, as well as FIGS. 12-13 and 16). This annular collar extends axially inwardly on the duct from the end thereof to extend beyond clamp 34. The overlapping peripheral ends of collar 38 are secured to each other as by riveting, adhesive, or the equivalent, to maintain it in snug relationship forming a sealing ring to lock up the jacket which also extends around the peripheral edge of leg 28 (lower right portion of FIG. 11). The overlapping ends cause the collar 38 to act as a draw band to accommodate varying diameter elements and to fit over any rough spots in the elements.

Leg 28 of ring 24 includes orifices therethrough, e.g., slits, holes or otherwise, to allow a limited amount of air flow from the outer axial face of leg 28 through it and into the insulation between the air impervious polymeric tube 12 and the overlying air impervious jacket 32 for improved thermal insulation for reasons explained hereinafter.

Obviously the diameter and length of the flexible insulated duct assembly formed, and illustrated in FIGS. 9 and 10, will vary to suit the usage involved. Typically it will be employed for conveying heated air or cooled air for environmental control purposes. The novel assembly has been found particularly effective for rapid installation with resulting low thermal losses and minimal condensation characteristics, as well as negligible leakage, particularly when combined with the novel transition components one embodiment of which is shown in FIGS. 14, 17 and 18-20.

In FIG. 14, three of the novel duct assemblies 10 are shown combined with a transition component 50.

Transition component assembly 50 is formed in erector set type fashion by the use of novel elements which form a skeletal framework to combine with and retain insulation board panels that comprise the walls. Specifically, the framework is formed of a plurality of elongated metallic components which are L-shaped in cross sectional configuration. Some of these elements, i.e., the parallel ones along the side edges, have end tabs which interfit with slots in the other elongated elements, i.e., the overlapping ones on the end edges. These metallic components are assembled with each other to secure the plurality of duct board panels..

More specifically, in the transition component 50, a pair of end duct board panels 52 and 54, each triangular in configuration, are arranged parallel to each other and interfit with a plurality, here three, of side duct board panels 56 forming a three dimensional polygon. Each of these panels typically comprises compressed fiberglass insulation 56a bonded to an external aluminum foil jacket 56. Unlike the insulation jacket around the duct, which is typically flexible, the duct panels, as is known in the trade, are basically stiff. These panels can be cut with diagonal edges to interfit with each other at the appropriate angular relationship depending upon whether the polygonal configuration is triangular in cross section as shown in the embodiment of FIGS. 14 and 17, or some other polygonal shape such as rectangular (FIGS. 21-23), pentagonal, hexagonal, or other desired polygon.

The material of the duct board panels is readily severed as with a knife so that suitable connecting orifices 56' can be cut into one or more of the panels. Here it is shown to be cut into all three panels 56 to accommodate all three ducts 10 in FIG. 14. Preferably, the aluminum jacket of each panel is marked with different size potential orifices to be cut therein (see the concentric numbered circles in FIG. 17) to allow the installer to readily cut an opening of the desired diameter and to guide the cut for its desired circular configuration.

Panel 52 also may have cut thereinto, at the job site or initially, a hand insertion opening 52' for manually securing the insulated duct 10 to the transition component by bending tabs in the manner explained hereinafter.

After the plurality of duct board panels 52, 54 and 56 are positioned in edge abutment with each other to enclose the space therebetween, the skeletal framework is assembled along the edges of the structure. In the embodiment depicted, the three generally L-shaped elongated metallic elements 60 that extend along the abutting edges of the three panels 56 that form the polygon are positioned so that each of the legs 62 and 64 overlap one of the adjacent panels, while the connecting tabs 62' and 64' on the ends thereof extend beyond the end panels 52 and 54. At each end of the transition component is a plurality, here three in number, of L-shaped elongated members 70. The legs 72 and 74 of these members are at a 90 degree angle to each other, while the legs of elements 60 are at an angle of 60 degrees to accommodate the angular relationship of the panels. Elements 70 have elongated slot type orifices 70' severed into the opposite end portions thereof. Thus, when elements 70 are placed over the adjacent edges of the end panels and side panels, tabs 62' and 64' of the respective members 60 will fit through these slots. Then, by bending over the tabs, the assembly is secured as depicted in FIG. 14.

Assembly of the ends of the insulated ducts to the transition component is readily made, in sharp contrast to the complicated assembly techniques of the prior art devices. More specifically, by simply providing or cutting an orifice 52' into one of the end panels, e.g. 52 (FIGS. 14 and 17), a person's hand can be inserted into the transition component to quickly bend over selected ones of the bendable tabs 22 inserted into the chamber. The springy compressible characteristics of the duct board allows the tabs to be embedded therein while causing a spring-back force to snugly retain the components together. This occurs after the end of the duct is inserted through the side opening 56' of panels 56 until the radially outwardly extending annular leg 28 of ring 24 abuts against the outer face of the panel. Then, by simply bending over selected or remaining tabs 22 (FIGS. 15 and 16) into deforming engagement with the fiberglass layer 56a this secures the duct tightly against the panel, with the curled bead of collar 38 engaging tightly against and slightly compressing the outer face of the duct panel as depicted in FIG. 16. The access opening 52' is then closed in a very simple fashion.

More specifically, a cover plate 75 (FIGS. 14, 19 and 20) having a polygonal shape generally corresponding to the polygonal shape of the transition component, and a size large enough to cover the opening 52' but small enough to fit within the outline of the skeletal framework and lie against the outer face of end panel 52 (FIG. 19), is positioned to cover the opening 52' and then rotated to cause the apices 75' thereof to slide between the skeletal components and adjacent panel 52 for retention of the cover plate in position. This can be readily done by slight deformation of the compressible end panel material. If access later need be made to the interior of the transition component, the cover plate simply is rotated back out of its locked position (FIG. 20) into its removable position (FIG. 19), and removed to uncover opening 52' for access.

Figure 21:
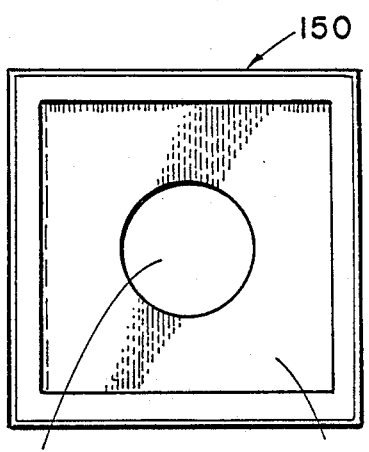
FIG. 21 is a top elevational view of a novel transition component made in accordance with the invention, but of a rectangular cross sectional configuration rather than a triangular cross sectional configuration as in the transition component of FIGS. 14 and 17-20.
Figure 22:
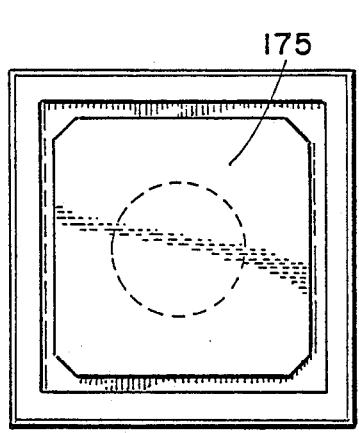
FIG. 22 is a view comparable to FIG. 1 but with a cover plate over the opening.
Figure 23:
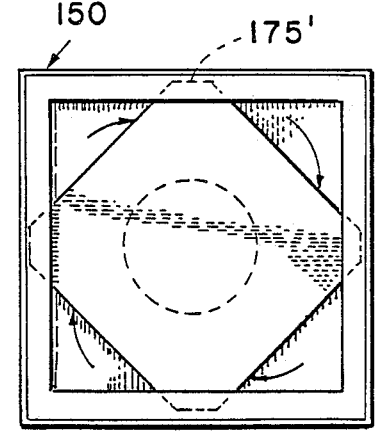
FIG. 23 is a view comparable to FIG. 22 but with the cover plate rotated into locked position.

As mentioned previously, the particular cross sectional configuration of the transition component may be other than triangular, e.g., see the rectangular configuration in FIGS. 21-23. In this instance, the end panels would still be parallel to each other, but the peripheral panels would be four in number and encompassed by a like plurality of skeletal framework elements. Moreover, if an end access opening is used for this transition assembly 150, the opening 152' in the end panel 152 can be covered by a rectangular shaped cover plate 175 which is large enough to cover the opening 152' but small enough to fit within the skeletal framework of the assembly, against the outer face of panel 152, such that rotation of the cover plate (FIG. 23) will cause its apices 175' to slide between the skeletal elements and the end panel by slight deformation of the end panel, thereby securing the cover plate in position. Instead of this four sided polygon, the polygon may be of any desired number of sides. Also, the number of connecting ducts can vary in number as desired.

Figure 24:
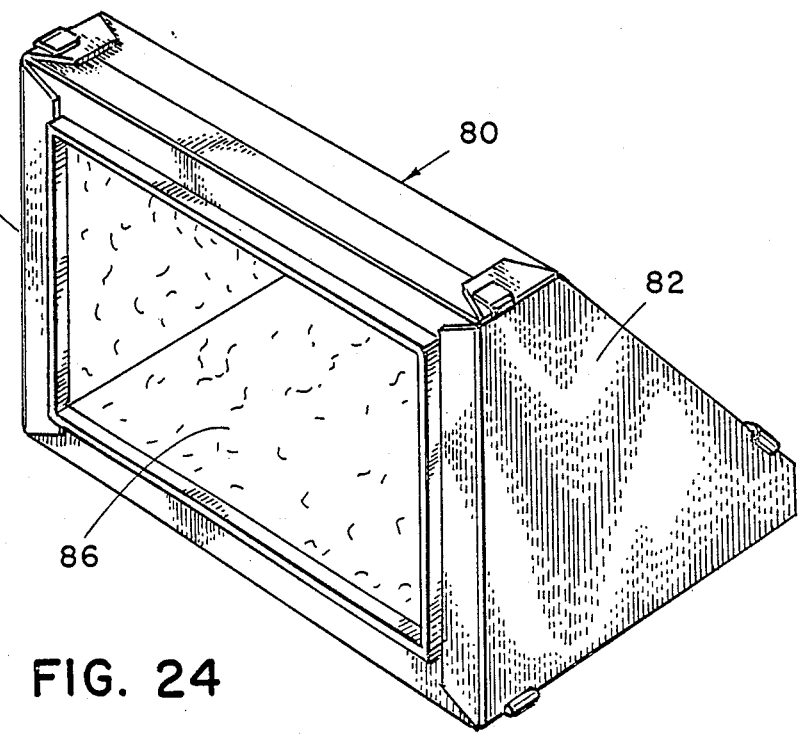
FIG. 24 is a perspective view of a ceiling outlet for a system made in accordance with the invention.

In FIG. 24 is depicted a ceiling outlet structure for this novel system. More specifically, the polygonal component 80 has a pair of formed metallic end walls 82 and 84 with flanges bent over the side panels 86. These side panels may be arranged in triangular configuration, with one of them having an enlarged opening as shown to receive an adapter from the ceiling. A suitable opening can be formed in one wall for connecting a duct thereinto in the fashion described above relative to FIGS. 15 and 16.

Figure 25:
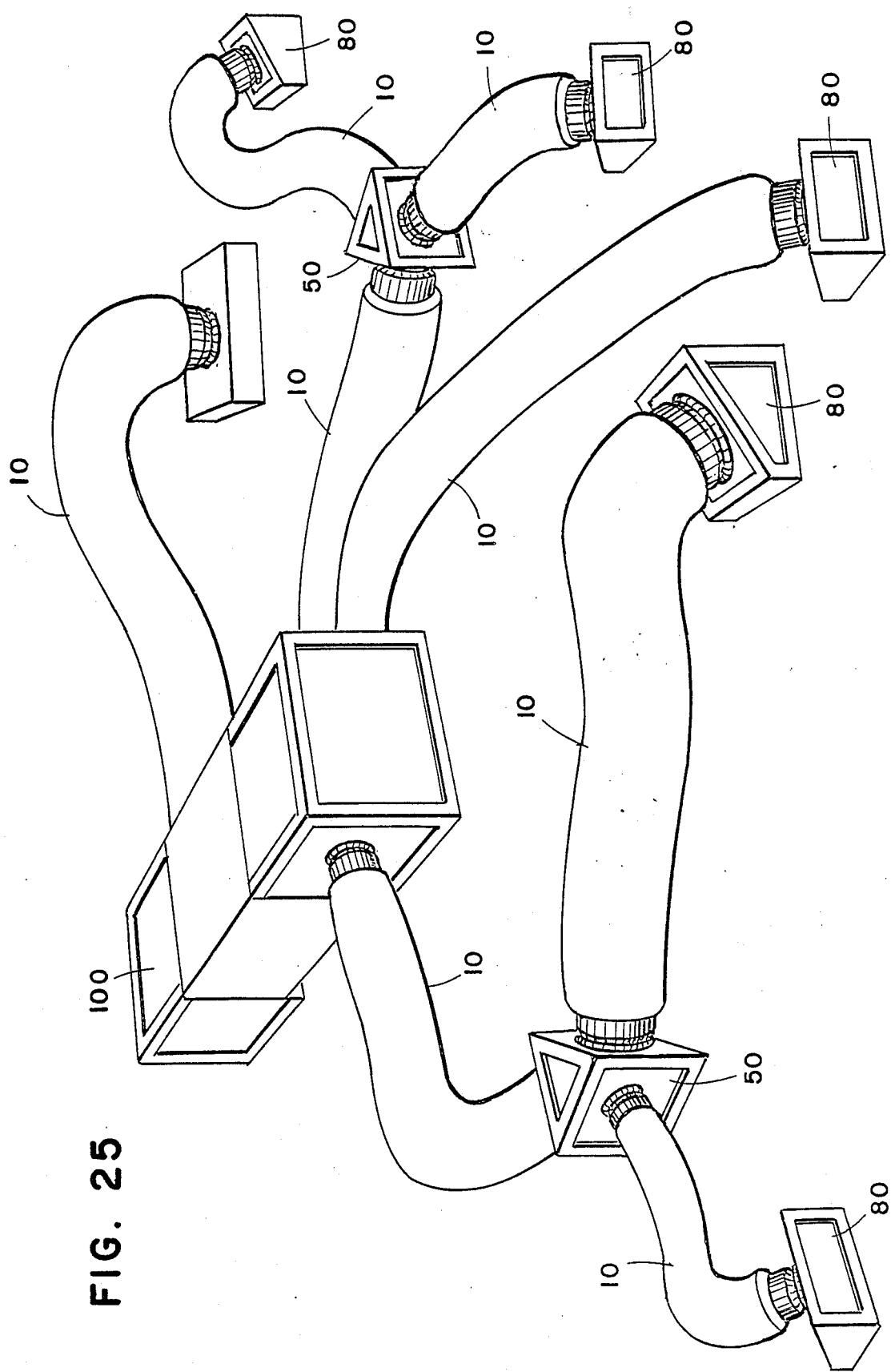
FIG. 25 is a perspective view of an assembly of ducts and transition components.

In FIG. 25 is depicted an assembled system of ducts 10, transition components 50, and ceiling outlets 80. The ducts and transition components are assembled to convey air from a central plenum 100 to the ceiling outlets 80. Ducts of different diameter are selected for different segments depending on the air volume handling requirements of the segments. As can be seen, the system can be easily configured to fit a desired installation.

When the ducts are assembled to the transition components, air leakage is basically prevented. Moreover, no metallic surfaces exposed to the cold air are exposed to the ambient air to cause undesirable condensation.

Further, a controlled amount of air is allowed to pass through the rings 16 into the porous insulation between the overlying jacket and the underlying tube, to cause a ballooning effect on the flexible jacket. This air ballooning effect increases the R factor rating significantly. In other words, any so called leakage from the system actually serves an advantage rather than a disadvantage. Yet the jacket is locked up at the ends to form a tight assembly.

As a consequence of the invention, the duct and transition components can be preassembled at the manufacturer and simply supplied for ready installation at the job site rather than requiring complex assembly by skilled craftsmen. The final assembly can be quickly and easily made at the site by semi-skilled labor, with very little or no waste.

The embodiments of the invention in which an exclusive property or privilege is claimed are defined as follows.

1. A transition component for a duct system comprising:
   a plurality of rigid metallic elements interfitted into a skeletal framework, said framework defining a pair of end planar portions in planes generally parallel to each other and peripheral planar portions in the form of a polygon between said end portions, said elements having connector means for interconnecting such elements to form said skeletal framework;
   a pair of duct board panels within said end portions and a plurality of duct board panels within said peripheral portions, said panels each having edges, a portion of each edge of each panel abutting an adjacent portion of an edge of another panel, panel holding means on each of said elements providing means for engaging said abutting panel edges for holding said panels in place to enclose the space within said framework and panels, said panels being individually capable of having an opening cut therein for insertion of the end of a duct.

2. The transition component in claim 1 wherein said framework elements are L-shaped in cross section to receive said abutting edges of said duct board panels and providing said panel holding means to hold said panels in place.

3. The transition component in claim 2 wherein;
   one of said panels has a reach-in opening for insertion of a hand to attach to said transition component a duct having attachment means extending through an opening cut in at least one of the other of said panels; and
   a cover plate over said reach-in opening, rotatable between the said one panel and the adjacent framework elements to be engaged therebetween and thereby retain said plate in closure position.

4. The transition component in claim 1 wherein:
   one of said panels has a reach-in opening for insertion of a hand to attach to said transition component a duct having attachment means extending through an opening cut in at least one of the other of said panels; and
   a cover plate over said reach-in opening.

5. The transition component of claim 1 in which some of said elements have said connector means extending from the ends thereof and received in openings in others of said elements for interconnecting the elements to form said skeletal framework.

6. A transition component for a duct system comprising:
   at least two ducts;
   a plurality of rigid frame elements;
   means for interconnecting said frame elements to form an eternal skeleton defining a plurality of planar portions; and
   a plurality of resiliently compressible planar panels each having edges, a portion of each edge of each panel abutting an adjacent portion of an edge of another panel, one of each panels being fitted within one of said skeleton planar portions, at least two of said panels having duct openings for receiving said ducts, said skeleton forming the exterior edges of said component and having means for engaging the abutting edges of said panels for holding the panels in place whereby all of said frame elements and said panels together enclose said transition component to form a closed enclosure except for the ducts extending into and secured in said duct openings.

7. The transition component in claim 6 wherein one of said panel defines an access opening large enough to receive a human hand for attaching a duct extending through an opening in another panel, and further wherein said component further comprises cover means for removably covering said access opening.

8. The transition component in claim 7 wherein said cover means comprises a plate overlying said one panel and rotatable between a release position wherein said plate can be removed from said panel and a locked position wherein said plate is sandwiched between said one panel and a portion of said exterior skeleton.

9. The transition component in claim 6 wherein said interconnecting means comprise integral slots and deformable tabs on said frame elements, said slots and tabs interfitting with one another when said elements are arranged to define said skeleton.

10. The transition composition in claim 9 wherein each of said frame elements is L-shaped in cross section to receive the abutting edges of adjacent panels.

11. The transition component in claim 10 wherein said panels are beveled at their edges whereby a mitered joint is formed at the abutting panel edges received by the L-shaped frame elements to thereby improve the interfitting of said panels at said frame elements.

12. The transition component in claim 10 wherein said panels are fabricated of duct board.

13. The transition component in claim 6 wherein each of said frame elements is L-shaped in cross section to receive the abutting edges of adjacent panels.

14. The transition component in claim 13 wherein one of said panels other than the two panels receiving said duct defines an access opening, and wherein said component further comprises a closure plate overlying said one panel and shiftable between a release position wherein said plate can be removed from said one panel and a locked position wherein the edge of said plate is sandwiched between said one panel and at least one of said L-shaped frame members.

* * * * *

UNITED STATES PATENT AND TRADEMARK OFFICE
CERTIFICATE OF CORRECTION

PATENT NO. : 4,890,864
DATED : January 2, 1990
INVENTOR(S) : Charles B. Anderson et al.

It is certified that error appears in the above-identified patent and that said Letters Patent is hereby corrected as shown below:

Col. 3, line 23;
   After "17" insert --is--;

Col. 8, line 8;
   "eternal" should be --external--;

Col. 8, line 42;
   "composition" should be --component--.

Signed and Sealed this

Twenty-first Day of January, 1992

Attest:

HARRY F. MANBECK, JR.

*Attesting Officer*    *Commissioner of Patents and Trademarks*